United States Patent
Brearley et al.

(10) Patent No.: US 7,110,841 B1
(45) Date of Patent: Sep. 19, 2006

(54) MULTI-LEVEL SHIPPING INSTRUCTIONS IN MANUFACTURING SYSTEMS

(75) Inventors: Quentin Stewart Brearley, Rancho Palos Verdes, CA (US); James P. Chilvers, Irvine, CA (US)

(73) Assignee: Glovia International, Inc., El Segundo, CA (US)

( * ) Notice: Subject to any disclaimer, the term of this patent is extended or adjusted under 35 U.S.C. 154(b) by 0 days.

(21) Appl. No.: 11/015,678

(22) Filed: Dec. 17, 2004

Related U.S. Application Data

(60) Provisional application No. 60/530,631, filed on Dec. 17, 2003.

(51) Int. Cl.
 *G06F 19/00* (2006.01)
(52) U.S. Cl. .............................. 700/99; 700/100; 705/8; 705/26
(58) Field of Classification Search .................. 700/95, 700/99, 100, 101, 102; 705/26, 7, 8
 See application file for complete search history.

(56) References Cited

U.S. PATENT DOCUMENTS

| | | | |
|---|---|---|---|
| 6,141,647 A * | 10/2000 | Meijer et al. ............... | 700/100 |
| 6,615,092 B1 * | 9/2003 | Bickley et al. .............. | 700/99 |
| 6,629,008 B1 * | 9/2003 | Shiiba et al. ............... | 700/100 |
| 6,915,275 B1 * | 7/2005 | Banerjee et al. ............ | 705/26 |
| 6,934,594 B1 * | 8/2005 | Loring et al. ............... | 700/100 |

* cited by examiner

*Primary Examiner*—Albert W. Paladini
*Assistant Examiner*—Charles Kasenge
(74) *Attorney, Agent, or Firm*—Baker Botts L.L.P.

(57) ABSTRACT

A system for utilizing multi-level shipping instructions in a manufacturing system includes multiple elements. A first element can receive an order and generate an electronic, text-based file that includes shipping instructions identifying a product. The first element can also identify a second element based on the order and transmit the file to the second element. The second element can receive the file and identify manufacturing activities based on the shipping instructions. The second element can also determine whether at least one downstream element is involved in the manufacture of the product. For each downstream element determined to be involved in the manufacture of the product, the second element can determine whether the shipping instructions are inappropriate for the downstream element, modify the shipping instructions if the shipping instructions are inappropriate for the downstream element, and transmit the shipping instructions to the downstream element.

36 Claims, 4 Drawing Sheets

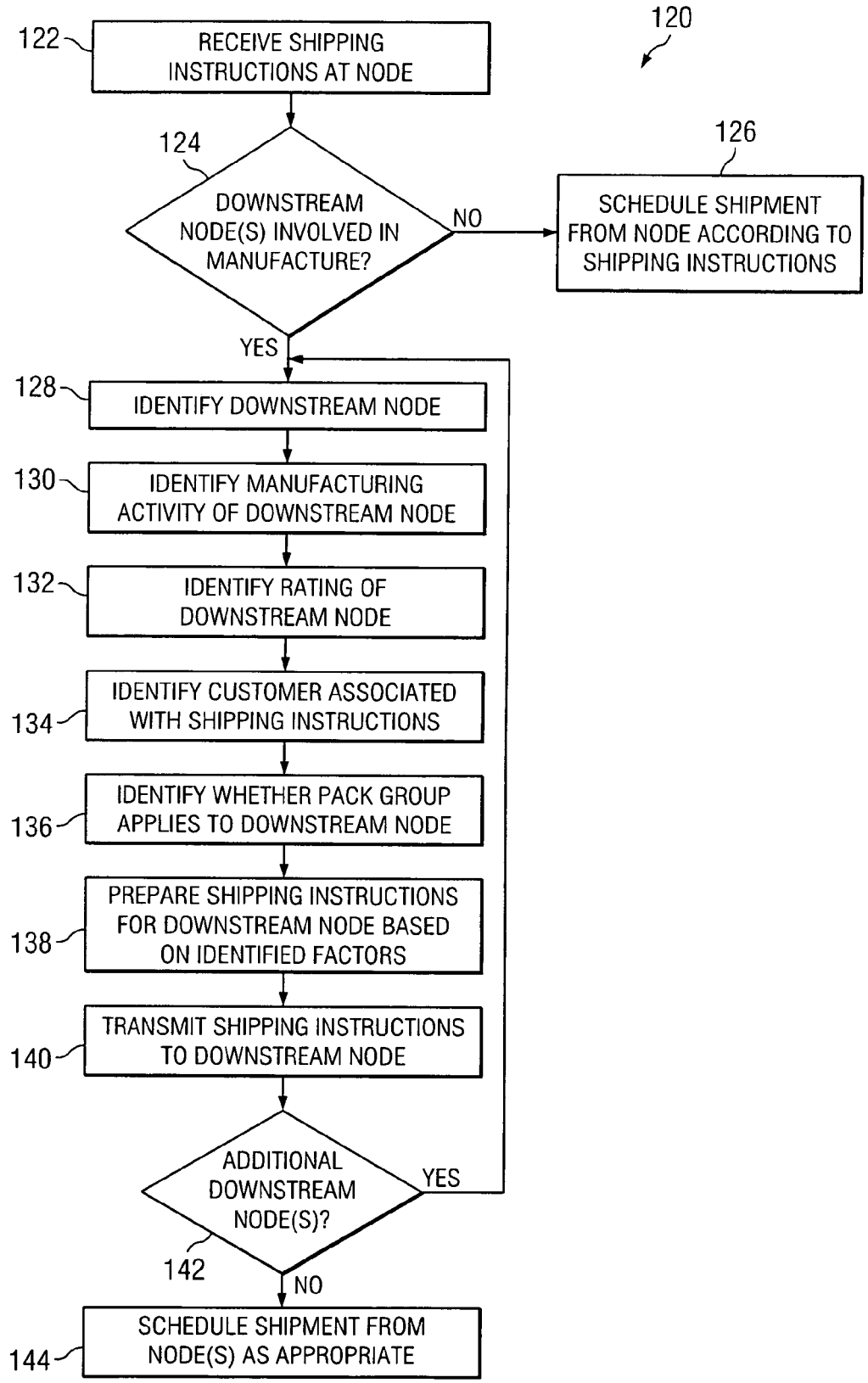

MULTI-LEVEL SHIPPING INSTRUCTIONS IN MANUFACTURING SYSTEMS

RELATED APPLICATION

This application claims priority to U.S. Provisional Patent Application Ser. No. 60/530,631 filed Dec. 17, 2003, entitled Global Business Management.

TECHNICAL FIELD OF THE INVENTION

The present invention relates generally to shipping instructions, and, more particularly, to utilizing multi-level shipping instructions in manufacturing systems.

BACKGROUND OF THE INVENTION

Manufacturing systems often distribute manufacturing activities among multiple remote locations. Manufacturing resources and manufactured products are often shipped between these locations. Manufactured products are also often shipped to customers.

SUMMARY OF THE INVENTION

In accordance with the present invention, techniques for utilizing multi-level shipping instructions in manufacturing systems are provided. According to particular embodiments, these techniques enable elements within manufacturing systems to coordinate shipping activities using multi-level shipping instructions.

According to a particular embodiment, a system for utilizing multi-level shipping instructions in a manufacturing system includes multiple elements. A first element can receive an order and generate an electronic, text-based file that includes shipping instructions identifying a product. The first element can also identify a second element based on the order and transmit the file to the second element. The second element can receive the file and identify manufacturing activities based on the shipping instructions. The second element can also determine whether at least one downstream element is involved in the manufacture of the product. For each downstream element determined to be involved in the manufacture of the product, the second element can determine whether the shipping instructions are inappropriate for the downstream element, modify the shipping instructions if the shipping instructions are inappropriate for the downstream element, and transmit the shipping instructions to the downstream element.

Embodiments of the invention provide various technical advantages. According to particular embodiments, these techniques may eliminate or reduce inefficiencies and other problems associated with traditional manufacturing systems. For example, these techniques may allow an element in a manufacturing system to forward appropriate shipping instructions to downstream elements. These techniques may also allow an element to identify and modify inappropriate shipping instructions before forwarding the shipping instructions to downstream elements. Shipping instructions may be modified based on relevant factors to create shipping instructions appropriate for particular downstream elements. In these ways, shipping instructions may reach elements that can ship resources, components, and/or products appropriately. Thus, these techniques may increase coordination among elements in a manufacturing system. Furthermore, these techniques may completely or partially automate the process of delivering shipping instructions in a distributed manufacturing environment. Using these techniques, shipping instructions may be sent out later in the manufacturing process. Transmitting shipping instructions later in the manufacturing process may reduce inefficiencies and errors associated with sending replacement shipping instructions due to changed circumstances.

Other technical advantages of the present invention will be readily apparent to one skilled in the art from the following figures, descriptions, and claims. Moreover, while specific advantages have been enumerated, various embodiments may include all, some, or none of the enumerated advantages.

BRIEF DESCRIPTION OF THE DRAWINGS

For a more complete understanding of the present invention and its advantages, reference is made to the following description, taken in conjunction with the accompanying drawings, in which:

FIG. 5 is a flowchart illustrating a method of utilizing multi-level shipping instructions.

DETAILED DESCRIPTION OF THE INVENTION

Figure 1:
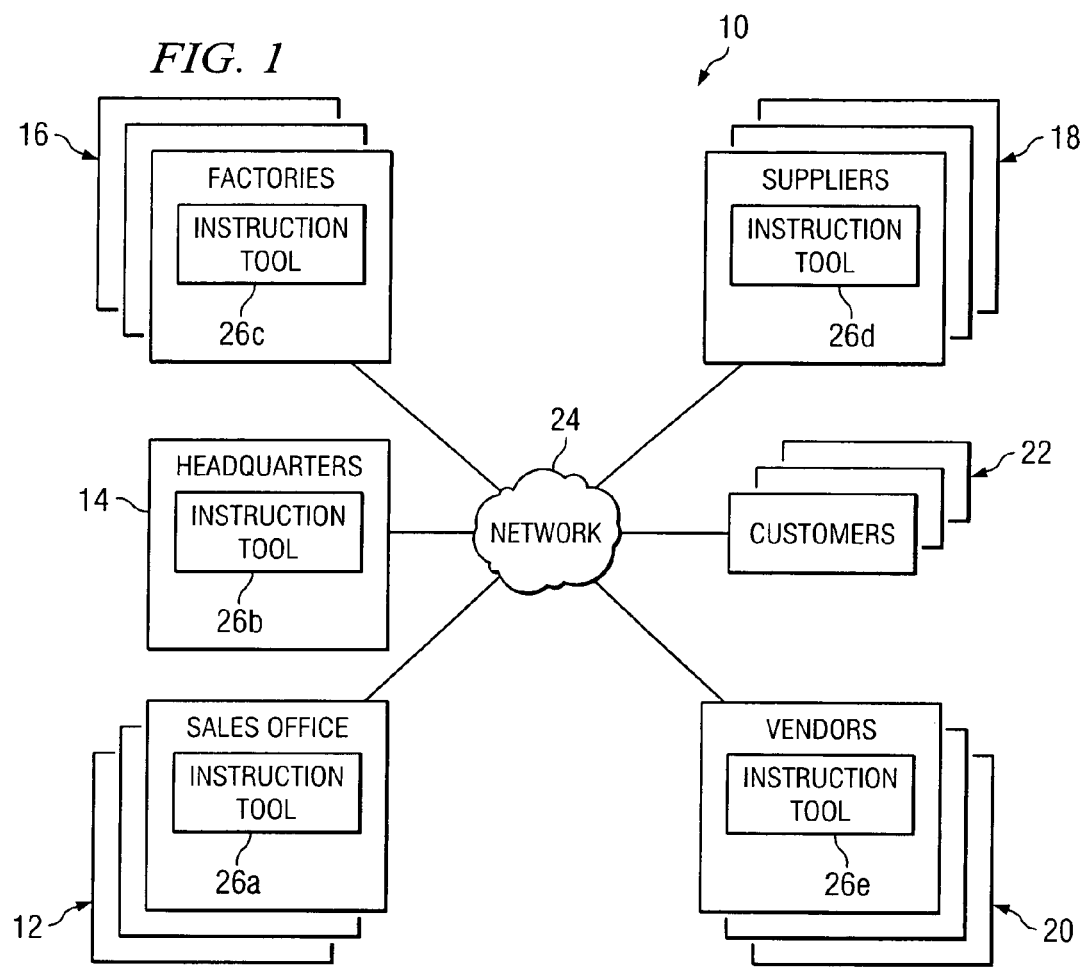
FIG. 1 illustrates a manufacturing system that includes elements capable of using multi-level shipping instructions in accordance with various embodiments of the present invention.

FIG. 1 illustrates a manufacturing system, indicated generally at 10, that includes sales offices 12, headquarters 14, factories 16, suppliers 18, vendors 20, and customers 22 interconnected through a network 24. As illustrated, sales offices 12, headquarters 14, factories 16, suppliers 18, and vendors 20 each include an instruction tool 26 for use in utilizing multi-level shipping instructions in manufacturing system 10. In general, instruction tool 26 receives, processes, and transmits shipping instructions. In particular, instruction tool 26 may identify whether received shipping instructions relate to manufacturing activities involving downstream elements in manufacturing system 10, modify the received shipping instructions as appropriate for the identified downstream elements, and transmit the shipping instructions to the identified downstream elements.

Sales offices 12 represent distributed business offices for generating demand for the manufacture of products in manufacturing system 10. Headquarters 14 represents a centralized business office for managing and planning aspects of manufacturing activities occurring within manufacturing system 10. Factories 16 represent facilities involved in the manufacture of products. Suppliers 18 and vendors 20 represent entities that supply resources for use in the manufacturing process. Customers 22 represent entities requesting the manufacture of products in manufacturing system 10. Sales offices 12, headquarters 14, factories 16, suppliers 18, vendors 20, and customers 22 may each include appropriate hardware, software, and controlling logic capable of communicating with other elements of manufacturing system 10 through network 24.

Network 24 represents any suitable collection of hardware, software, and controlling logic capable of interconnecting elements coupled to network 24. In a particular embodiment, network 24 may include one or multiple networks, such as a telecommunications network, a local area network (LAN), a wide area network (WAN), the Internet, and/or any other appropriate networks. Thus, network 24 provides infrastructure to support communications within manufacturing system 10.

Instruction tool 26 represents any suitable collection of hardware, software, and controlling logic for utilizing multi-level shipping instructions in manufacturing system 10. Thus, according to a particular embodiment, instruction tool 26 is a software application loaded onto a general purpose computer.

In operation, customers 22 request manufacture of products within manufacturing system 10. For example, customers 22 may communicate with sales offices 12 and/or headquarters 14 using network 24 to request production of products by factory 16. In response to orders for products and/or at any other appropriate time, elements of manufacturing system 10 may schedule manufacture of the products. For example, a particular factory 16 may order resources from other factories 16, suppliers 18, and/or vendors 20. Resources may include raw materials, components, fuel, time, energy, manpower, and/or any other supply used by elements of manufacturing system 10 to manufacture products. Thus, manufacture of products may be scheduled to occur at any one or a combination of multiple elements within manufacturing system 10.

In response to a request for manufacture of a product from customer 22, sales offices 12 and/or headquarters 14 may identify a promise date associated with a sales order. The promise date may be a date on which the requested products are promised to be available or delivered to the requesting customer 22. Sales offices 12 and/or headquarters 14 may desire to insulate manufacturing facilities such as factories 16, suppliers 18, and vendors 20 from changes to sales orders, yet maintain the integrity of the promise date. Thus, sales offices 12 and/or headquarters 14 may desire to wait to communicate shipping instructions to manufacturing elements of manufacturing system 10 as long as possible.

According to particular embodiments, a lead time may be calculated to determine when to send shipping instructions to manufacturing elements of manufacturing system 10. Lead times may be calculated in various ways using various factors. For example, lead times may be standard time periods. Alternatively or in addition, by identifying locations of, for example, factories 16 involved in a particular manufacturing process, identifying volumes and distances of shipments required by a particular shipping instruction, and/or using other appropriate factors, lead times may be calculated. Using lead times, factories 16, suppliers 18, and/or vendors 20 may be insulated from changes to sales orders caused by, for example, changes in requirements of customers 22.

According to a particular embodiment, one or more elements of manufacturing system 10 may communicate shipping instructions to another element or elements of manufacturing system 10. For example, a particular sales office 12 may transmit shipping instructions to elements of manufacturing system 10 identified by sales office 12 as being involved in the manufacturing process of a particular product. Thus, elements of manufacturing system 10 may distribute one or multiple shipping instructions to one or more other elements of manufacturing system 10.

In some embodiments, an element of manufacturing system 10 may not store information identifying every other element of manufacturing system 10 involved in the manufacture of a particular product. For example, one factory 16 may subcontract work to another factory 16 and/or order resources used in the manufacture of a particular product from suppliers 18 and/or vendors 20. Furthermore, suppliers 18 and vendors 20 similarly may procure resources from other suppliers 18, other vendors 20, and/or other factories 16. The subcontracting or procurement activities of particular elements of manufacturing system 10 may not be known, for example, to sales office 12. Thus, in these circumstances or at any other appropriate time, shipping instructions may be communicated serially through manufacturing system 10 from one element to another. For example, sales office 12 may communicate shipping instructions to a particular factory 16, and the particular factory 16 may communicate the shipping instructions to a particular supplier 18 known only to factory 16 as being involved in the manufacture of the particular product.

The shipping instructions may include various types of information relevant to shipment of resources and/or products. For example, shipping instructions may include promise dates, shipment dates, identifications of customers, customer information such as shipping addresses, assembly instructions regarding assembly of components into products, identifiers of manufacturing activities, sales orders, and/or other appropriate information. According to particular embodiments, the shipping instruction conforms to an extensible markup language (XML) standard. Thus, the shipping instruction may be communicated as an XML document through network 24.

Two specific types of shipping instructions include relay ship instructions and drop ship instructions. A relay ship instruction instructs a receiving element to ship resources and/or a product to an upstream element involved in the manufacture of a product. A drop ship instruction instructs a receiving element to ship resources and/or a product to a customer. Thus, relay ship instructions and drop ship instructions may be appropriate at different times.

As used herein, a downstream element represents an element of manufacturing system 10 utilized by another element of manufacturing system 10 to supply resources and/or to perform manufacturing activities associated with a requested product, while an upstream element represents an element of manufacturing system 10 that utilizes another element of manufacturing system 10 to supply resources and/or to perform manufacturing activities associated with a requested product. Uses of the terms downstream and upstream are relative with respect to a particular element. Thus, for example, relative to a particular factory 16, a downstream element includes a particular supplier 18 subcontracted by the particular factory 16 to supply a component used by factory 16 to produce a requested product. Relative to the particular supplier 18, the particular factory 16 is an upstream element.

Shipping instructions may be processed by instruction tools 26 at various elements or elements within manufacturing system 10. According to a particular embodiment, an element, such as factory 16, receiving a shipping instruction may utilize instruction tool 26 to identify a manufacturing process associated with the shipping instruction. For example, instruction tool 26 may have knowledge of several manufacturing activities occurring at factory 16. Instruction tool 26 may identify one of these manufacturing processes in various ways, such as using an identifier in the received shipping instructions. After identifying the manufacturing process, instruction tool 26 may determine whether downstream elements are involved in the identified manufacturing process. Then, instruction tools 26 may determine whether the received shipping instructions are appropriate for downstream elements identified as being involved in the manufacture of a product. This determination may be made using a variety of factors. For example, the determination may be made based on one or more factors such as an identity of the customer, an identity of the downstream element, and/or the particular manufacturing activity to be performed by the downstream element.

For example, the identity of a customer and/or the identity of a downstream element identified as involved in the manufacture of a product associated with received shipping instructions may indicate to instruction tool 26 whether the received shipping instructions are appropriate for a particular downstream element. According to particular embodiments, information related to particular customers, downstream elements, and manufacturing activities may be stored in instruction tool 26. For example, instruction tool 26 may store ratings of downstream elements that indicate the trustworthiness of the downstream elements with regard to drop shipping resources and/or products directly to customers. Instruction tool 26 may determine based on the ratings and/or any other appropriate factors that a particular downstream element is not trusted to drop ship resources and or products to a customer. Thus, if the received shipping instructions include a drop shipment instruction, instruction tool 26 may determine that the drop shipment is not appropriate for the downstream element. Furthermore, the identity of the downstream element may be relevant in terms of specifying a particular date for shipment of a product or resource from the downstream element. For example, a more reliable downstream element may be provided a later date when compared to a less reliable downstream element.

The manufacturing activity to be performed by the downstream element may also be relevant in determining whether received shipping instructions are appropriate for downstream elements. If a particular downstream element is part of a pack group, assembly of components or other resources will be required. A pack group identifies that multiple resources or products should be combined before the combined resources or products are shipped to a customer. When a pack group exists, a downstream factory 16, supplier 18, or vendor 20 supplying a resource, such as a component, that will be combined with other resources, such as other components, may be instructed to ship the resource to an upstream element rather than sending the resource to the customer 22. Therefore relay ship instructions may be particularly appropriate when a pack group exists. Thus, for example, a relay ship instruction may be appropriate for forwarding to a downstream element when the downstream element produces a product or supplies a resource that is utilized by the sending element and/or an upstream element.

While resources supplied by suppliers 18 and/or vendors 20 may be relay shipped to an upstream element for processing of the shipped resource, a drop ship instruction instructs a receiving element to ship a resource, or perhaps a completed product, to a customer. Thus, a drop ship instruction may be appropriate for forwarding to a downstream element when the downstream element produces a complete product and the upstream elements are comfortable allowing the downstream element to ship the final product to the particular customer 22.

If received shipping instructions are appropriate for downstream elements, the receiving element may transmit the shipping instructions to the downstream elements without modification through network 24. Alternatively or in addition, if the received shipping instructions are inappropriate for downstream elements, the receiving element may modify the shipping instructions to create appropriate shipping instructions for the downstream elements before transmitting the modified shipping instructions through network 24. Furthermore, any manufacturing activities to be performed at the receiving element may be scheduled and performed at the receiving element.

When received instructions are inappropriate for a downstream element, the shipping instructions may be modified in various ways. For example, particular instructions may be removed and new instructions may be inserted into the shipping instructions. Dates in the shipping instructions may be changed. Destinations may be changed. Various other parts of the shipping instructions may be changed.

Thus, elements within manufacturing system 10 may receive, process, and transmit shipping instructions using instruction tool 26. Appropriate shipping instructions may be distributed to manufacturing facilities located in remote locations. For example, using a standard such as XML, manufacturing facilities located throughout the world may cooperate to manufacture and ship products. Utilizing a common architecture for shipping instructions, time and costs associated with the shipping process may be reduced. Furthermore, shipping decisions may be fully or partially automated using instruction tools 26 operating at one or more locations within manufacturing system 10.

Note that while illustrated as being located within each of sales offices 12, headquarters 14, factories 16, suppliers 18, and vendors 20, instruction tools 26 may be utilized in less than every location within manufacturing system 10. For example, instruction tools 26 may be located within selected sales offices 12, factories 16, suppliers 18, and/or vendors 20. Furthermore, instruction tool 26 may be installed at only one element of manufacturing system 10.

Figure 2:
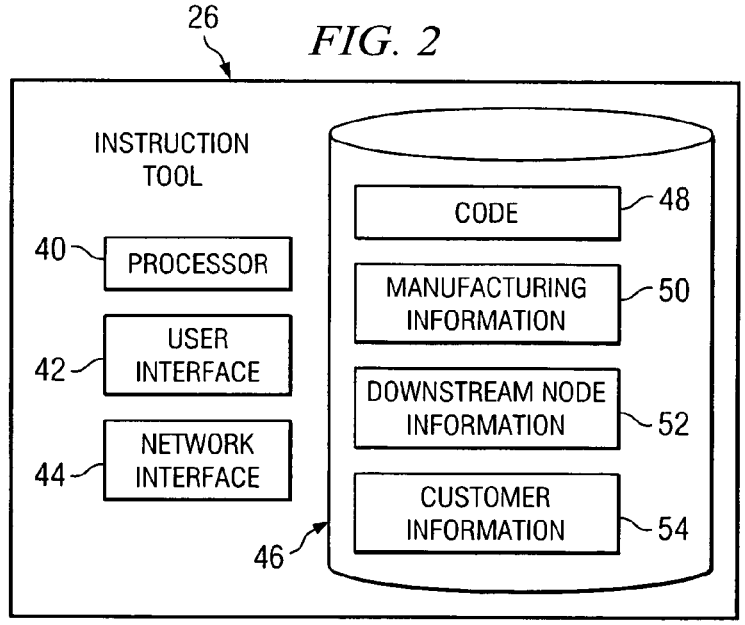
FIG. 2 illustrates functional components of an instruction tool that utilizes multi-level shipping instructions in a manufacturing system.

FIG. 2 is a block diagram illustrating exemplary functional components of instruction tool 26. In the embodiment illustrated, instruction tool 26 includes a processor 40, a user interface 42, a network interface 44, and a memory 46. These functional components can operate to utilize multi-level instructions in manufacturing system 10.

Processor 40 represents any hardware and/or logic elements operable to control and process information. Processor 40 controls the operation and administration of elements within instruction tool 26. For example, processor 40 operates to process information received from user interface 42, network interface 44, and memory 46. Thus, processor 40 may be a programmable logic device, a controller, and/or any other suitable processing device.

User interface 42 represents hardware and/or software for inputting information into instruction tool 26 and outputting information from instruction tool 26. For example, user interface 42 may receive input such as information regarding a manufacturing process, downstream elements, and/or customers from a user of instruction tool 26. User interface 42 may also display this information to a user of instruction tool 26. Thus, user interface 42 may include hardware components such as keyboard, mouse, display, and/or other appropriate devices as well as associated software for inputting and outputting information.

Network interface 44 represents hardware and/or software operable to communicate information to and receive information from devices coupled to instruction tool 26. For example, network interface 44 may communicate with sales offices 12, headquarters 14, factories 16, suppliers 18, vendors 20, and customers 22. Thus, network interface 44 includes any suitable hardware or controlling logic to communicate information to or from elements coupled to instruction tool 26.

Memory 46 represents any one or a combination of volatile or non-volatile local or remote devices suitable for storing information. Memory 46 stores, either permanently or temporarily, data or other information for processing by processor 40 and communicating using user interface 42 and/or network interface 44. For example, memory 46 may include random access memory (RAM), read only memory (ROM), magnetic storage devices, optical storage devices, or any other suitable information storage device or a combination of these devices. As illustrated, memory 46 may include one or more memory modules.

Code 48 includes software, executable files, and/or appropriate logic modules capable when executed to control the operation of instruction tool 26. For example, code 48 may include executable files capable of processing shipping instructions. Manufacturing information 50 stores information related to manufacturing processes associated with element or elements within manufacturing system 10. For example, manufacturing information 50 may indicate pack groups identifying multiple downstream elements involved in a particular manufacturing process, downstream elements supplying resources for use in a particular manufacturing process, and/or other relevant information. Downstream element information 52 stores information relevant to particular downstream elements. For example, downstream element information 52 may include ratings of particular downstream elements for use in determining whether particular shipping instructions are appropriate for particular downstream elements. Customer information 54 stores information relevant to particular customers. For example, customer information 54 may include preferences of customers 22 and/or required shipping instructions for particular customers 22.

In operation, instruction tool 26 utilizes multi-level shipping instructions to coordinate shipping of resources and products in manufacturing system 10. Shipping instructions may be received at instruction tool 26 using network interface 44. For example, upstream elements in manufacturing system 10 may communicate shipping instructions to instruction tool 26 through network 24 using network interface 44.

Processor 40 may analyze the received shipping instructions by executing code 48. For example, processor 40 may identify manufacturing processes associated with the shipping instruction. Processor 40 may access manufacturing information 50 to identify the manufacturing processes. Processor 40 may also execute code 48 to determine whether downstream elements are involved in the manufacturing process. For each downstream element determined to be involved in the manufacturing process, code 48 may instruct processor 40 to analyze downstream element information 52 and customer information 54 to determine whether received shipping instructions are appropriate for forwarding to a downstream element.

When shipping instructions are appropriate to be forwarded downstream, network interface 44 may forward the shipping instructions through network 24 to the downstream element. Alternatively or in addition, when shipping instructions are inappropriate to be forwarded to downstream elements, processor 40 may execute code 48 to modify the shipping instructions to make the shipping instructions appropriate. For example, particular shipping instructions may be removed or edited. Alternatively or in addition, shipping instructions may be added. For example, a drop shipment instruction may be replaced with a relay ship instruction when manufacturing information 50 identifies a pack group associated with a particular downstream element.

User interface 42 may allow a user of instruction tool 26 to input, view, and/or modify information stored in memory 46. For example, manufacturing information 50, downstream element information 52, and/or customer information 54 may be viewed, inputted, or modified using user interface 42. According to a particular embodiment, a user of instruction tool 26 may make decisions regarding appropriateness of shipping instructions and modification of shipping instructions before shipping instructions are transmitted to downstream elements. For example, code 48 may be executed by processor 40 to analyze received shipping instructions and suggest appropriateness and modifications to the received shipping instructions to the user. Alternatively or in addition, user interface 42 may allow a user of instruction tool 26 to make independent decisions regarding appropriateness and modifications of received shipping instructions.

Shipping instructions may be communicated from instruction tool 26 using network interface 44. For example, instruction tool 26 may communicate shipping instructions to downstream elements in manufacturing system 10 through network 24 using network interface 44.

Thus, the elements of instruction tool 26 may utilize multi-level shipping instructions in manufacturing system 10. Instruction tool 26 may assist in the distribution of shipping instructions within manufacturing system 10 and in coordination of shipping activities using the shipping instructions.

While this example includes specific functional components for instruction tool 26, instruction tool 26 may include any collection and arrangement of components, including some or all of the enumerated functional components, for utilizing multi-level shipping instructions. Moreover, instruction tool 26 contemplates implementing each of the functional components using any suitable combination and arrangement of hardware and/or logic, and implementing any of the functionalities using a computer program stored on a computer readable medium. Furthermore, instruction tool 26 may be implemented as a stand-alone device, or aspects of instruction tool 26 may be distributed among various devices.

Figure 3:
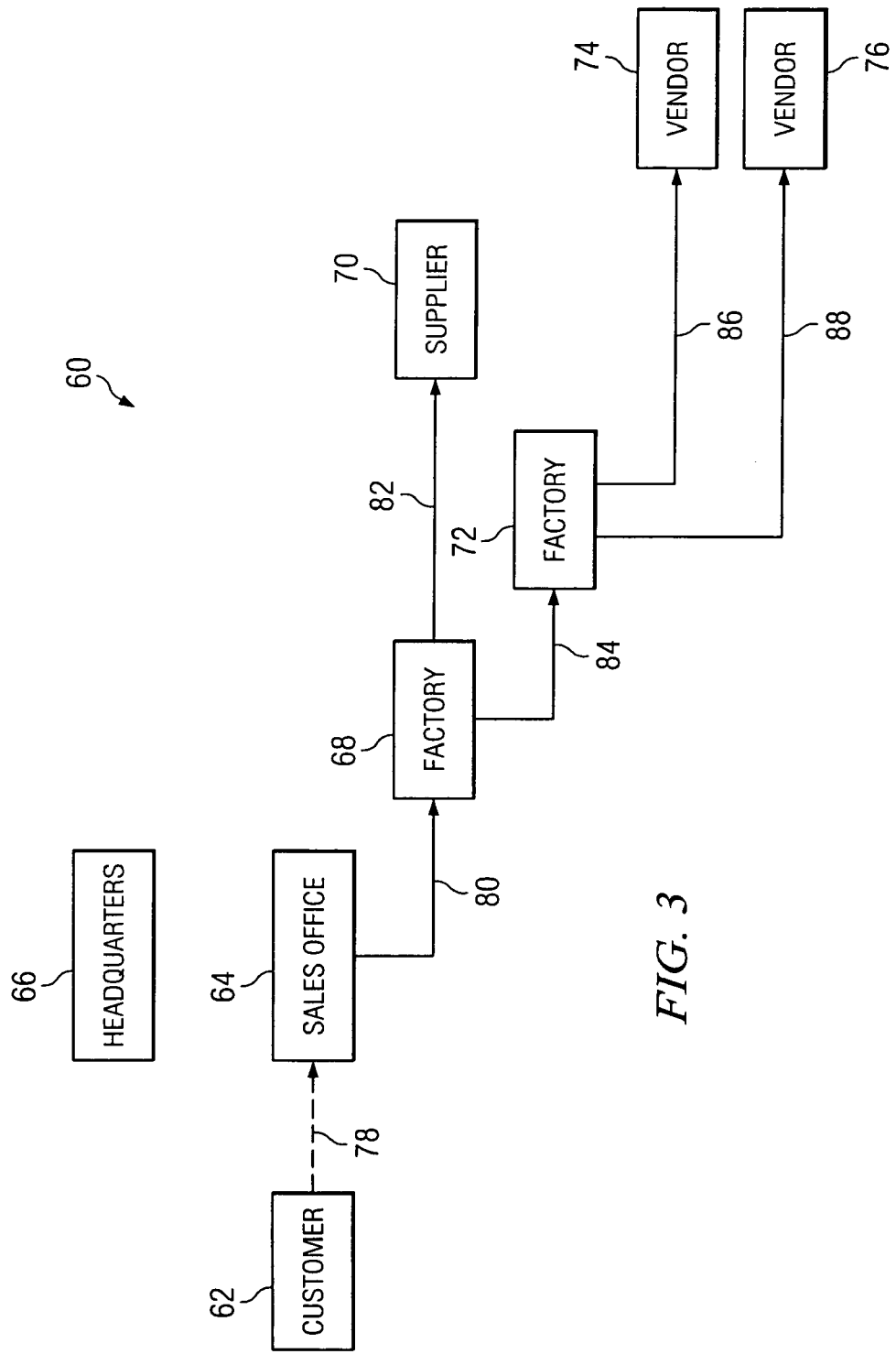
FIG. 3 illustrates delivery of multi-level shipping instructions in a distributed manufacturing environment.

FIG. 3 illustrates an example of use of multi-level shipping instructions in a distributed manufacturing environment 60. Distributed manufacturing environment 60 represents one embodiment of manufacturing system 10 organized in a flowchart fashion. Distributed manufacturing environment 60 includes customer 62, sales office 64, headquarters 66, factory 68, supplier 70, factory 72, vendor 74, and vendor 76. Two or more of these elements may cooperate to manufacture products.

As illustrated, customer 62 transmits an order 78 for a product to sales office 64. Alternatively, customer 62 may transmit an order to headquarters 66, factory 68, or any other appropriate element. Sales office 64 receives order 78 and plans manufacturing activities in distributed manufacturing environment 60. At an appropriate time, sales office 64 may communicate shipping instructions 80 to factory 68. For example, as described above, sales office 64 may wait to transmit shipping instructions 80 until some amount of time before a date delivery of the manufactured product is promised to customer 62. However, shipping instructions 80 may be communicated at any appropriate time. Furthermore, according to a particular embodiment shipping instructions 80 may include an identifier of a manufacturing activity at factory 68, a date for shipping a product, and an instruction to drop ship a requested product to customer 62. For illustrative purposes, order 78 will be assumed to be an order for a computer and a monitor.

Factory 68 may analyze the received shipping instructions 80. For example, factory 68 may determine that shipping instructions 80 refer to a manufacturing activity involving not only factory 68 but also supplier 70 and factory 72. For example, factory 68 may have enlisted the assistance of supplier 70 to supply the monitor and factory 72 to manufacture the computer. Thus, with respect to factory 68, supplier 70 and factory 72 may be downstream elements. Furthermore, sales office 64 is an upstream element with respect to factory 68. Note that even though factory 68 may store information related to use of supplier 70 and factory 72 to manufacture the computer and monitor, upstream elements such as sales office 64 may or may not have knowledge of supplier 70 and/or factory 72.

Factory 68 may store information identifying a pack group involving a supplier 70 and factory 72. For example, the monitor supplied by supplier 70 and the computer supplied by factory 72 may be intended to be packed together into one package before being shipped to customer 62. Thus, factory 68 may analyze the received shipping instructions and determine that a drop shipment instruction included in the received shipping instructions is not appropriate to be forwarded to supplier 70 or factory 72. Thus, factory 68 may modify the received shipping instructions to include relay shipment instructions. Furthermore, factory 68 may determine that a relay instruction, in the absence of a pack group, may be appropriate based on other relevant information such as an identity of customer 62 and/or the identities or ratings of supplier 70 and factory 72.

Thus, factory 68 prepares shipping instructions for transmittal to supplier 70 and factory 72. The preparation may include replacing the drop ship instruction with a relay ship instruction. After processing shipping instructions 80, factory 68 transmits shipping instructions 82 to supplier 70 and shipping instructions 84 to factory 72. Note that shipping instructions 82 and 84 may be the same or different for supplier 70 and factory 72. Furthermore, factory 68 may schedule manufacturing and shipping activities at factory 68 based on shipping instructions 80, 82, and 84.

Supplier 70 receives shipping instructions 82 and analyzes the received shipping instructions to identify the manufacturing activity at supplier 70 associated with shipping instructions 82. As illustrated, supplier 70 may not identify any downstream elements associated with the manufacturing activity identified using shipping instructions 82. Thus, supplier 70 may simply schedule manufacturing and shipping processes at supplier 70 based on shipping instructions 82. If shipping instructions 82 include a relay shipment instruction, supplier 70 will eventually ship the supplied monitor to factory 68.

Factory 72 receives shipping instructions 84. Factory 72 analyzes shipping instructions 84 to determine a manufacturing activity at factory 72 associated with shipping instructions 84. In the example posed, this manufacturing activity is the manufacture of a computer. As illustrated, factory 72 may determine that manufacture of the computer includes use of two downstream elements: vendor 74 and vendor 76. For example, vendor 74 may be used to supply a processor for use by factory 72 in manufacturing the computer. Similarly, vendor 76 may be used by factory 72 to supply memory for use in manufacturing the computer. Thus, according to a particular embodiment, vendor 74 and vendor 76 may be identified as downstream elements included in a pack group. Factory 72 may modify shipping instructions 84 as appropriate to include a relay ship instruction with factory 72 as the destination. After processing the shipping instructions, factory 72 may transmit shipping instructions 86 to vendor 74 and shipping instructions 88 to vendor 76. Factory 72 may also schedule manufacturing activities at factory 72 based on shipping instructions 84, 86, and 88.

Vendor 74 receives shipping instructions 86 and vendor 76 receives shipping instructions 88. Vendors 74 and 76 analyze the received shipping instructions to identify manufacturing activities. As illustrated, vendors 74 and 76 may not identify any downstream elements associated with the manufacturing activity identified using shipping instructions 86 and 88. Thus, vendors 74 and 76 may simply schedule manufacturing and shipping processes based on shipping instructions 86 and 88. If shipping instructions 86 and 88 include a relay shipment instruction, vendors 74 and 76 will eventually ship the supplied processor and memory to factory 72.

Thus, distributed manufacturing environment 60 includes various elements capable of utilizing multi-level shipping instructions. Each element may receive shipping instructions, process the shipping instructions as appropriate, and transmit shipping instructions to downstream elements if downstream elements are determined to be involved in manufacturing activities associated with the received shipping instructions.

Figure 4:
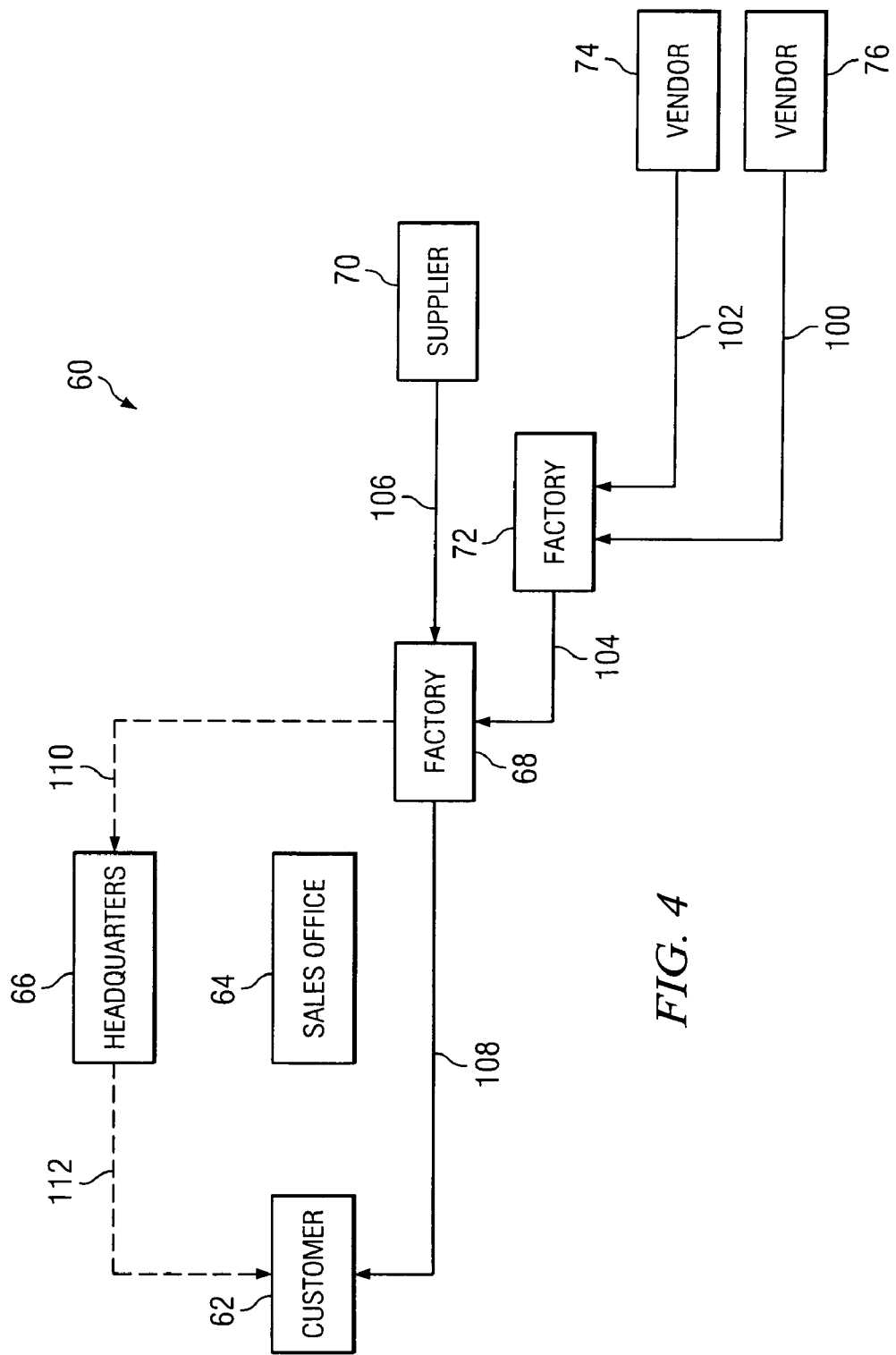
FIG. 4 illustrates shipment of manufacturing resources and manufactured products according to multi-level shipping instructions in a distributed manufacturing environment.

FIG. 4 illustrates shipment of manufacturing resources and manufactured products according to multi-level shipping instructions used in distributed manufacturing environment 60. Vendor 74 ships the requested processor to factory 72 in shipment 102, and vendor 76 ships the requested memory to factory 72 in shipment 100. Factory 72 receives and assembles the processor and memory into the computer. Then factory 72 ships the assembled computer to factory 68 in shipment 104. Supplier 70 supplies the requested monitor to factory 68 in shipment 106. Note that shipments 100, 102, 104, and 106 each illustrate relay shipments.

Factory 68 receives and assembles the computer and monitor before drop shipping the assembled computer and monitor to customer 62 in shipment 108. Sales office 64 is excluded from shipment 108 due to the drop ship instruction previously received by factory 68 from sales office 64.

Alternatively, factory 68 may relay ship the assembled computer and monitor to headquarters 66 in shipment 110 if a previously received shipping instruction so directed. In that case, headquarters 66 would receive and ship the assembled computer and monitor to customer 62 in shipment 112. This illustrates that shipments may be made to elements not directly involved in the actual production of the requested product. Various reasons may support this practice. One example is the situation in which headquarters 66 is located in a country with preferable tax consequences for shipping the assembled product to customer 62.

Note that sales office 64 may retain an open sales order that may be closed when shipment 108 is shipped to or reaches customer 62. For example, factory 68 may notify sales office 64 of shipment 108 so that sales office 64 may close the sales order. Furthermore, any element in distributed manufacturing environment 60 may hold open records related to the manufacturing activity at the particular element until notified that a downstream element has completed its assigned manufacturing task.

Thus, elements within distributed manufacturing environment 60 may ship resources and products according to shipping instructions distributed within distributed manufacturing environment 60.

FIG. 5 is a flowchart illustrating a method 120 for utilizing multi-level shipping instructions in manufacturing system 10. Instruction tool 26 receives shipping instructions at a particular element at step 122. Instruction tool 26 determines whether downstream elements are involved in a manufacturing activity associated with the received shipping instructions at step 124. If instruction tool 26 determines that downstream elements are not involved in the manufacturing activity associated with the received shipping instructions, instruction tool 26 may schedule shipment of related resources or products from the element according to the shipping instructions at step 126. On the other hand, if instruction tool 26 determines that downstream elements are involved in the manufacturing activity associated with the received shipping instructions, instruction tool 26 identifies a downstream element associated with the manufacturing activity at step 128.

Instruction tool 26 may identify various factors to assist the element and/or a user of instruction tool 26 in determining whether the received shipping instructions are appropriate for downstream elements. For example, instruction tool 26 identifies the manufacturing activity of the identified downstream element at step 130 and a rating of the downstream element at step 132. Instruction tool 26 also identifies a customer associated with the shipping instructions at step 134 and whether a pack group applies to the downstream element at step 136. Any one or more of these factors may be used by instruction tool 26 to prepare shipping instructions for downstream element at step 138.

Received shipping instructions may be forwarded without modification if the received shipping instructions are appropriate. However, if received shipping instructions are inappropriate, instruction tool 26 may modify the shipping instructions. Thus, instruction tool 26 prepares shipping instructions for the downstream element based on the identified factors at step 138 and transmits the shipping instructions to the downstream element at step 140.

At step 142, instruction tool 26 determines whether additional downstream elements are involved in the manufacture of the product. If additional downstream elements are involved in the manufacture of the product, method 120 returns to step 128. Alternatively, if additional downstream elements are not involved in the manufacture of the product, instruction tool 26 may schedule shipment from the element as appropriate at step 144.

Thus, method 120 illustrates steps an element within manufacturing system 10 may take to utilize multi-level shipping instructions. These steps may allow shipping instructions to be received, processed, and transmitted as appropriate so that the shipping instructions are distributed throughout manufacturing system 10 in a timely and efficient manner. Note that each element may complete the steps outlined in method 120. Alternatively, one dedicated element may act as a server to distribute shipping instructions appropriately.

Note that while discussed as being utilized in manufacturing system 10, multi-level shipping instructions may be utilized in any appropriate system. Furthermore, multi-level shipping instructions may be utilized in non-manufacturing systems. For example, multi-level shipping instructions may be useful in industries involved in distribution, construction, equipment erection, and/or pure assembly.

The preceding flowchart illustrates a particular method used to utilize multi-level shipping instructions. However, this flowchart illustrates only an exemplary method of operation, and the present invention contemplates any suitable techniques, elements, and applications for performing these functions. Thus, many of the steps in the flowchart may take place simultaneously and/or in different orders than as shown. In addition, methods may include additional steps or fewer steps, so long as the methods remain appropriate. Moreover, one or more elements of manufacturing system 10 may work independently and/or in conjunction with other elements to utilize multi-level shipping instructions.

Although the present invention has been described in several embodiments, a myriad of changes or modifications may be suggested to one skilled in the art, and it is intended that the present invention encompass such changes and modifications as fall within the present appended claims.

What is claimed is:

1. A system for utilizing multi-level shipping instructions in a manufacturing system, comprising:
   a first element operable to receive an order associated with manufacture of a product, to generate an electronic, text-based file based on the order, the file including shipping instructions identifying the product, to identify a second element based on the order, and to transmit the file to the second element; and
   the second element operable to receive the file including the shipping instructions, to identify manufacturing activities to be completed at the second element based on the shipping instructions, to generate instructions for the identified manufacturing activities to be completed at the second element, to determine whether at least one downstream element is involved in the manufacture of the product, and, for each downstream element determined to be involved in the manufacture of the product, to identify a rating of the downstream element, to determine whether the shipping instructions are inappropriate for the downstream element at least in part based on the rating of the downstream element, to modify the shipping instructions if the shipping instructions are determined to be inappropriate for the downstream element, and to transmit the shipping instructions to the downstream element.

2. The system of claim 1, further comprising:
   a plurality of downstream elements each operable to receive the shipping instructions, the shipping instructions identifying at least one resource used in the manufacture of the product and an address, to identify the resource based on the shipping instructions, and to schedule shipment of the resource to the address.

3. The system of claim 1, wherein the second element is further operable, for each downstream element determined to be involved in the manufacture of the product, to determine whether to transmit a drop shipment instruction or a relay shipment instruction to the downstream element, to ensure that the shipping instructions include the drop shipment instruction in response to determining to transmit the drop shipment instruction to the downstream element, and to ensure that the shipping instructions include the relay shipment instruction in response to determining to transmit the relay shipment instruction to the downstream element.

4. The system of claim 1, wherein the second element is further operable, for each downstream element determined to be involved in the manufacture of the product, to identify a manufacturing activity to be completed at the downstream element and to determine whether the shipping instructions are inappropriate for the downstream element at least in part based on the identified manufacturing activity to be completed at the downstream element.

5. The system of claim 1, wherein the second element is further operable, for each downstream element determined to be involved in the manufacture of the product, to identify a customer associated with the shipping instructions and to determine whether the shipping instructions are inappropriate for the downstream element at least in part based on the identified customer.

6. The system of claim 1, wherein the second element is further operable, for each downstream element determined to be involved in the manufacture of the product, to identify whether the downstream element is part of a pack group and to ensure that the shipping instructions include a relay shipment instruction in response to identifying that the downstream element is part of the pack group.

7. The system of claim 1, wherein the shipping instructions received by the second element include an assembly instruction instructing the second element to assemble multiple components of the product.

8. The system of claim 1, wherein the shipping instructions received by each downstream element identify at least one upstream element and include a relay shipment instruction instructing the downstream element to ship a resource used in the manufacture of the product to the identified upstream element.

9. The system of claim 1, wherein the file conforms to an extensible markup language (XML) standard.

10. A method for utilizing multi-level shipping instructions in a manufacturing system, comprising:
at a first element:
receiving an order associated with manufacture of a product;
generating an electronic, text-based file based on the order, the file including shipping instructions identifying the product;
identifying a second element based on the order; and
transmitting the file to the second element; and
at the second element:
receiving the file including the shipping instructions;
identifying manufacturing activities to be completed at the second element based on the shipping instructions;
generating instructions for the identified manufacturing activities to be completed at the second element;
determining whether at least one downstream element is involved in the manufacture of the product; and
for each downstream element determined to be involved in the manufacture of the product:
identifying a rating of the downstream element;
determining whether the shipping instructions are inappropriate for the downstream element at least in part based on the rating of the downstream element;
modifying the shipping instructions if the shipping instructions are determined to be inappropriate for the downstream element; and
transmitting the shipping instructions to the downstream element.

11. The method of claim 10, further comprising:
at each of a plurality of downstream elements:
receiving the shipping instructions, the shipping instructions identifying at least one resource used in the manufacture of the product and an address;
identifying the resource based on the shipping instructions; and
scheduling shipment of the resource to the address.

12. The method of claim 10, further comprising:
at the second element:
for each downstream element determined to be involved in the manufacture of the product:
determining whether to transmit a drop shipment instruction or a relay shipment instruction to the downstream element;
ensuring that the shipping instructions include the drop shipment instruction in response to determining to transmit the drop shipment instruction to the downstream element; and
ensuring that the shipping instructions include the relay shipment instruction in response to determining to transmit the relay shipment instruction to the downstream element.

13. The method of claim 10, further comprising:
at the second element:
for each downstream element determined to be involved in the manufacture of the product:
identifying a manufacturing activity to be completed at the downstream element; and
determining whether the shipping instructions are inappropriate for the downstream element at least in part based on the identified manufacturing activity to be completed at the downstream element.

14. The method of claim 10, further comprising:
at the second element:
for each downstream element determined to be involved in the manufacture of the product:
identifying a customer associated with the shipping instructions; and
determining whether the shipping instructions are inappropriate for the downstream element at least in part based on the identified customer.

15. The method of claim 10, further comprising:
at the second element:
for each downstream element determined to be involved in the manufacture of the product:
identifying whether the downstream element is part of a pack group; and
ensuring that the shipping instructions include a relay shipment instruction in response to identifying that the downstream element is part of the pack group.

16. The method of claim 10, wherein the shipping instructions received by the second element include an assembly instruction instructing the second element to assemble multiple components of the product.

17. The method of claim 10, wherein the shipping instructions received by each downstream element identify at least one upstream element and include a relay shipment instruction instructing the downstream element to ship a resource used in the manufacture of the product to the identified upstream element.

18. The method of claim 10, wherein the file conforms to an extensible markup language (XML) standard.

19. Logic for utilizing multi-level shipping instructions in a manufacturing system, the logic encoded in media and operable when executed to:
at a first element:
receive an order associated with manufacture of a product;
generate an electronic, text-based file based on the order, the file including shipping instructions identifying the product;
identify a second element based on the order; and
transmit the file to the second element; and at the second element:
receive the file including the shipping instructions;
identify manufacturing activities to be completed at the second element based on the shipping instructions;
generate instructions for the identified manufacturing activities to be completed at the second element;
determine whether at least one downstream element is involved in the manufacture of the product; and
for each downstream element determined to be involved in the manufacture of the product:
identify a rating of the downstream element;
determine whether the shipping instructions are inappropriate for the downstream element at least in part based on the rating of the downstream element;
modify the shipping instructions if the shipping instructions are determined to be inappropriate for the downstream element; and
transmit the shipping instructions to the downstream element.

20. The logic of claim 19, further operable when executed to:
at each of a plurality of downstream elements:
receive the shipping instructions, the shipping instructions identifying at least one resource used in the manufacture of the product and an address;
identify the resource based on the shipping instructions; and
schedule shipment of the resource to the address.

21. The logic of claim 19, further operable when executed to:
at the second element:
for each downstream element determined to be involved in the manufacture of the product:
determine whether to transmit a drop shipment instruction or a relay shipment instruction to the downstream element;
ensure that the shipping instructions include the drop shipment instruction in response to determining to transmit the drop shipment instruction to the downstream element; and
ensure that the shipping instructions include the relay shipment instruction in response to determining to transmit the relay shipment instruction to the downstream element.

22. The logic of claim 19, further operable when executed to:
at the second element:
for each downstream element determined to be involved in the manufacture of the product:
identify a manufacturing activity to be completed at the downstream element; and
determine whether the shipping instructions are inappropriate for the downstream element at least in part based on the identified manufacturing activity to be completed at the downstream element.

23. The logic of claim 19, further operable when executed to:
at the second element:
for each downstream element determined to be involved in the manufacture of the product:
identify a customer associated with the shipping instructions; and
determine whether the shipping instructions are inappropriate for the downstream element at least in part based on the identified customer.

24. The logic of claim 19, further operable when executed to:
at the second element:
for each downstream element determined to be involved in the manufacture of the product:
identify whether the downstream element is part of a pack group; and
ensure that the shipping instructions include a relay shipment instruction in response to identifying that the downstream element is part of the pack group.

25. The logic of claim 19, wherein the shipping instructions received by the second element include an assembly instruction instructing the second element to assemble multiple components of the product.

26. The logic of claim 19, wherein the shipping instructions received by each downstream element identify at least one upstream element and include a relay shipment instruction instructing the downstream element to ship a resource used in the manufacture of the product to the identified upstream element.

27. The logic of claim 19, wherein the file conforms to an extensible markup language (XML) standard.

28. A system for utilizing multi-level shipping instructions in a manufacturing system, comprising:
at a first element:
means for receiving an order associated with manufacture of a product;
means for generating an electronic, text-based file based on the order, the file including shipping instructions identifying the product;
means for identifying a second element based on the order; and
means for transmitting the file to the second element; and
at the second element:
means for receiving the file including the shipping instructions;
means for identifying manufacturing activities to be completed at the second element based on the shipping instructions;
means for generating instructions for the identified manufacturing activities to be completed at the second element;
means for determining whether at least one downstream element is involved in the manufacture of the product; and
for each downstream element determined to be involved in the manufacture of the product:
means for identifying a rating of the downstream element;
means for determining whether the shipping instructions are inappropriate for the downstream element at least in part based on the rating of the downstream element;
means for modifying the shipping instructions if the shipping instructions are determined to be inappropriate for the downstream element; and
means for transmitting the shipping instructions to the downstream element.

29. The system of claim 28, further comprising:
at each of a plurality of downstream elements:
means for receiving the shipping instructions, the shipping instructions identifying at least one resource used in the manufacture of the product and an address;

means for identifying the resource based on the shipping instructions; and means for scheduling shipment of the resource to the address.

30. The system of claim 28, further comprising:

at the second element:

for each downstream element determined to be involved in the manufacture of the product:

means for determining whether to transmit a drop shipment instruction or a relay shipment instruction to the downstream element;

means for ensuring that the shipping instructions include the drop shipment instruction in response to determining to transmit the drop shipment instruction to the downstream element; and means for ensuring that the shipping instructions include the relay shipment instruction in response to determining to transmit the relay shipment instruction to the downstream element.

31. The system of claim 28, further comprising:

at the second element:

for each downstream element determined to be involved in the manufacture of the product:

means for identifying a manufacturing activity to be completed at the downstream element; and means for determining whether the shipping instructions are inappropriate for the downstream element at least in part based on the identified manufacturing activity to be completed at the downstream element.

32. The system of claim 28, further comprising:

at the second element:

for each downstream element determined to be involved in the manufacture of the product:

means for identifying a customer associated with the shipping instructions; and means for determining whether the shipping instructions are inappropriate for the downstream element at least in part based on the identified customer.

33. The system of claim 28, further comprising:

at the second element:

for each downstream element determined to be involved in the manufacture of the product:

means for identifying whether the downstream element is part of a pack group; and means for ensuring that the shipping instructions include a relay shipment instruction in response to identifying that the downstream element is part of the pack group.

34. The system of claim 28, wherein the shipping instructions received by the second element include an assembly instruction instructing the second element to assemble multiple components of the product.

35. The system of claim 28, wherein the shipping instructions received by each downstream element identify at least one upstream element and include a relay shipment instruction instructing the downstream element to ship a resource used in the manufacture of the product to the identified upstream element.

36. The system of claim 28, wherein the file conforms to an extensible markup language (XML) standard.

* * * * *